United States Patent
Hada et al.

(10) Patent No.: US 10,321,066 B2
(45) Date of Patent: Jun. 11, 2019

(54) LIGHT SOURCE ESTIMATING APPARATUS AND IMAGE PICKUP APPARATUS

(71) Applicant: Kabushiki Kaisha Toshiba, Minato-Ku, Tokyo (JP)

(72) Inventors: Ryuji Hada, Yokohama Kanagawa (JP); Ken Tanabe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 71 days.

(21) Appl. No.: 14/943,235

(22) Filed: Nov. 17, 2015

(65) Prior Publication Data
US 2017/0070655 A1 Mar. 9, 2017

Related U.S. Application Data

(60) Provisional application No. 62/214,120, filed on Sep. 3, 2015.

(51) Int. Cl.
*H04N 9/73* (2006.01)
*H04N 5/235* (2006.01)
*G01J 3/28* (2006.01)

(52) U.S. Cl.
CPC ............. *H04N 5/2351* (2013.01); *G01J 3/28* (2013.01); *H04N 9/735* (2013.01)

(58) Field of Classification Search
CPC .................................................. H04N 5/2354
USPC .......................................... 348/223.1, 224.1
See application file for complete search history.

(56) References Cited

U.S. PATENT DOCUMENTS

| | | | |
|---|---|---|---|
| 7,436,997 B2 | 10/2008 | Ishigami et al. | |
| 2004/0095478 A1 | 5/2004 | Takano et al. | |
| 2004/0105017 A1* | 6/2004 | Aotsuka | H04N 5/772 348/223.1 |
| 2008/0101690 A1* | 5/2008 | Hsu | H04N 1/6027 382/162 |
| 2015/0022684 A1* | 1/2015 | Kaida | H04N 5/2351 348/223.1 |
| 2016/0162907 A1* | 6/2016 | Liu | G06K 7/10722 235/462.41 |
| 2016/0344992 A1* | 11/2016 | D'Alfonso | A61B 1/00006 |
| 2017/0006226 A1* | 1/2017 | Chino | H04N 5/23245 |

FOREIGN PATENT DOCUMENTS

| | | |
|---|---|---|
| JP | 2004-040417 A | 2/2004 |
| JP | 2011-030091 A | 2/2011 |

* cited by examiner

*Primary Examiner* — Anthony J Daniels
(74) *Attorney, Agent, or Firm* — White & Case LLP

(57) ABSTRACT

A light source estimating apparatus of embodiments has a sensitivity ratio spatial distribution calculating unit configured to extract a first color pixel and a second color pixel which have close spectral sensitivity and which have different sensor responses from a first picked up image picked up with an image sensor under an arbitrary light source, and calculate a ratio between a signal value of the first color pixel and a signal value of the second color pixel to acquire a first sensitivity ratio spatial distribution, and a similarity determining unit configured to estimate a type of the arbitrary light source based on similarity between a second sensitivity ratio spatial distribution group calculated using a second picked up image picked up with the image sensor under a known light source and the first sensitivity ratio spatial distribution.

14 Claims, 8 Drawing Sheets

| Gr | R |
|---|---|
| B | Gb |

| REFERENCE LIGHT SOURCE | REFERENCE OBJECT | | | | |
|---|---|---|---|---|---|
| | blue | cyan | green | red | ... |
| A LIGHT SOURCE | | | | | ... |
| D65 | | | | | ... |
| DAYTIME WHITE COLOR | | | | | ... |
| LIGHT BULB COLOR LED | | | | | ... |
| ⋮ | ⋮ | ⋮ | ⋮ | ⋮ | |

| Gr | R |
|---|---|
| B | WG |

| G | Wg | G | Wg |
|---|----|---|----|
| Wb | B | Wr | R |
| G | Wg | G | Wg |
| Wb | B | Wr | R |

FIG.13

LIGHT SOURCE ESTIMATING APPARATUS AND IMAGE PICKUP APPARATUS

CROSS-REFERENCE TO RELATED APPLICATIONS

This application is based upon and claims the benefit of priority from U.S. Provisional Application No. 62/214,120, filed on Sep. 3, 2015; the entire contents of which are incorporated herein by reference.

FIELD

Embodiments described herein relate generally to a light source estimating apparatus and an image pickup apparatus.

BACKGROUND

It is known that spectral distribution of an image of an object picked up with an image sensor can be expressed as a product of spectral radiance of a light source and spectral reflectivity of the object itself, and it is publicly known that a picked up image is affected by the light source. Therefore, in order to perform white balance processing for achieving the same balance of color under any light source or color isolation processing (color matrix processing) for correcting pixel mixture, light source information of an object to be shot is required. Further, also in the case where an image is corrected through digital processing for color shading occurring depending on a light source, light source information of an object to be shot is required.

When light source information required for such processing is acquired through automatic estimation, in order to achieve higher image quality of a picked up image through the image processing, it is important to perform light source estimation with high accuracy.

Conventionally, a light source estimating apparatus has been proposed which calculates a sensitivity ratio between an R pixel and a B pixel, and a sensitivity ratio between a B pixel and a G pixel and estimates a light source from correlation between these sensitivity ratios and a sensitivity ratio of a reference light source. However, with the above-described apparatus, influence of spectral spatial characteristics of an object itself is significant. Therefore, when there is deviation in color of an object, for example, when the whole screen is uniformly red, there is a problem that it is difficult to distinguish whether the object itself is red or the object looks red due to influence of the light source, which degrades accuracy of light source estimation.

DETAILED DESCRIPTION

A light source estimating apparatus according to embodiments includes a sensitivity ratio spatial distribution calculating unit configured to extract a first color pixel and a second color pixel which have close spectral sensitivity and which have different sensor responses from a first picked up image picked up with an image sensor under an arbitrary light source, and calculate a ratio between a signal value of the first color pixel and a signal value of the second color pixel to acquire a first sensitivity ratio spatial distribution, and a similarity determining unit configured to estimate a type of the arbitrary light source based on similarity between a second sensitivity ratio spatial distribution group calculated using a second picked up image picked up with the image sensor under a known light source and the first sensitivity ratio spatial distribution.

First Embodiment

Figure 1:
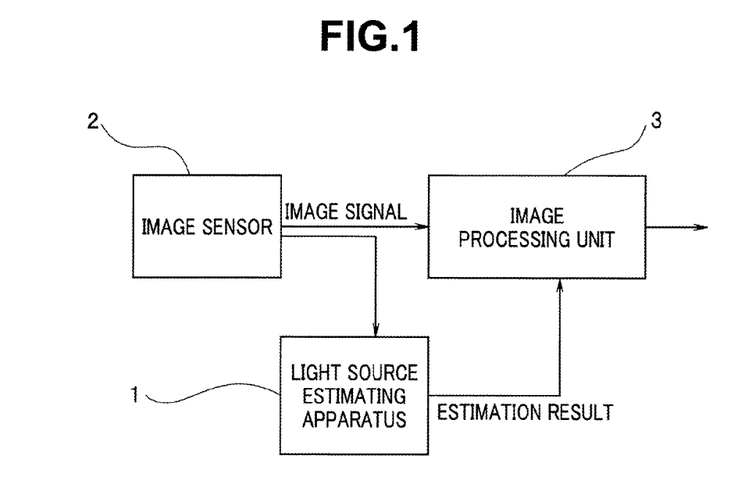
FIG. 1 is a block diagram illustrating one example of a configuration of an image processing apparatus including a light source estimating apparatus 1 according to a first embodiment.

FIG. 1 is a block diagram illustrating one example of a configuration of an image processing apparatus including a light source estimating apparatus 1 according to the present embodiment. The image processing apparatus has the light source estimating apparatus 1, an image sensor 2 and an image processing unit 3.

The image sensor 2 is comprised of a photoelectric conversion element which converts an image of an object formed on a light receiving face into an electric signal (hereinafter, referred to as an image signal). As the image sensor 2, for example, a CCD (charge coupled device) is used. The image signal is digitalized at an A/D converting unit which is not illustrated, and inputted to the light source estimating apparatus 1 and the image processing unit 3 as a RAW image. Note that, in the RAW image, a pixel value of one color is stored in each pixel based on a color filter array of an image pickup element.

The light source estimating apparatus 1 estimates a light source when an image of the object is picked up based on pixel data of the inputted RAW image. The estimation result is inputted to the image processing unit 3.

The image processing unit 3 carries out various kinds of image processing such as demosaic processing, white balance processing and color matrix processing on the inputted RAW image. In the demosaic processing, interpolating processing is performed on the pixel data in which a pixel value of one color is stored in each pixel, so that colors of respective colors (for example, RBG) are located in each pixel by utilizing surrounding pixel data, and a signal of a lacking color component for each pixel is generated. In the white balance processing, white balance is adjusted by multiplying the pixel data of RGB subjected to the demosaic processing by a gain for white balance adjustment determined based on the inputted light source estimation result. In the color matrix processing, color reproducibility is enhanced by multiplying the pixel data subjected to the white balance processing by a color correction matrix determined based on the inputted light source estimation result. In this manner, the image processing unit 3 performs various kinds of image processing using the light source estimation result from the light source estimating apparatus 1. Note that the above-described processing at the image processing unit 3 is one example and may be changed as appropriate, for example, other processing such as gamma correction processing may be added.

Figure 2:
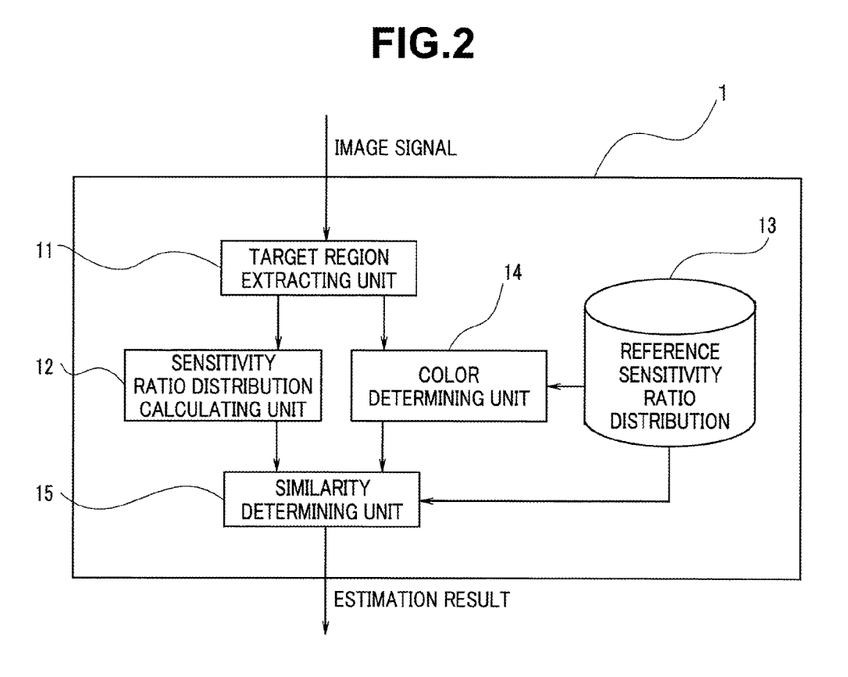
FIG. 2 is a block diagram illustrating one example of a detailed configuration of the light source estimating apparatus 1 according to the first embodiment.

FIG. 2 is a block diagram illustrating one example of a detailed configuration of the light source estimating apparatus 1 according to the present embodiment. The light source estimating apparatus 1 has a target region extracting unit 11, a sensitivity ratio distribution calculating unit 12, reference sensitivity ratio distribution 13, a color determining unit 14 and a similarity determining unit 15.

The target region extracting unit 11 sets an image region for which light source estimation is to be performed. The target region extracting unit 11 divides the RAW image into one or more partial images of an arbitrary size to divide the image region which becomes a target of light source estimation into blocks. Note that light source estimation may be performed on only a specific image region extracted from the partial images divided into blocks, or may be performed respectively on all the generated image regions, or may be performed assuming the RAW image corresponding to one frame as an image region and using all the pixel data of the frame. Further, in order to suppress a calculation amount and improve processing speed, it is also possible to perform sampling from the image signal at an arbitrary size, for example, pixels may be thinned out at predetermined intervals.

The sensitivity ratio distribution calculating unit 12 calculates spatial distribution of a sensitivity ratio of a sensitivity ratio calculation target color pixel (hereinafter, referred to as image pickup sensitivity ratio spatial distribution) for the image region which is a target of light source estimation set at the target region extracting unit 11. The sensitivity ratio calculation target color pixel (hereinafter, referred to as a target color pixel) indicates two color pixels which have close center of gravity of spectral sensitivity and which have a sensitivity difference in signal responses according to arrangement positions of the pixels, among the color filter pattern of the image sensor 2.

Figure 3:
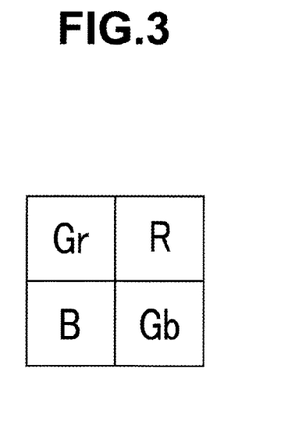
FIG. 3 is a diagram for explaining an array pattern of a color filter of an image sensor 2 according to the first embodiment.

FIG. 3 is a diagram for explaining an array pattern of a color filter of the image sensor 2 according to the present embodiment. A color filter pattern of FIG. 3 is a Bayer array, in which a red color pixel (R), a blue color pixel (B) and two green color pixels (Gr, Gb) are arranged.

Figure 4:
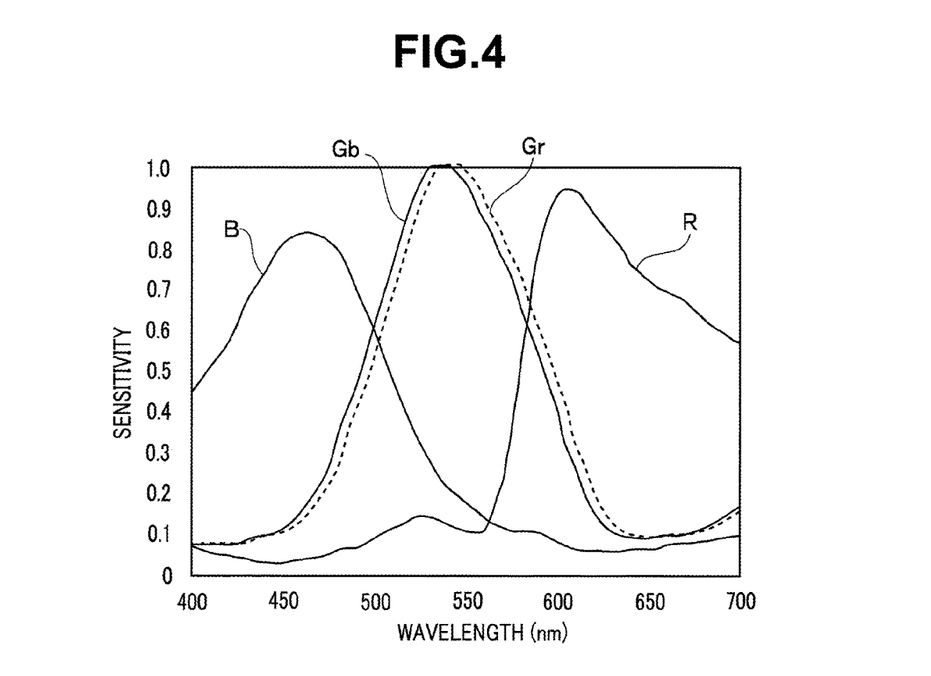
FIG. 4 is a diagram illustrating one example of spectral sensitivity characteristics of the color filter of FIG. 3.

FIG. 4 is a diagram illustrating one example of spectral sensitivity characteristics of the color filter of FIG. 3. A graph in FIG. 4 illustrates spectral sensitivity on a vertical axis and a wavelength on a horizontal axis. The spectral sensitivity on the vertical axis is expressed as a relative value which uses maximum sensitivity for each color light as 1. While sensitivity of the Gr pixel and sensitivity of the Gb pixel both become maximum in the vicinity of a wavelength of 540 nm, and the Gr pixel and the Gb pixel are pixels, whose centers of gravity of spectral sensitivity are close to each other, there occurs a sensitivity difference in signal responses according to arrangement positions. Hereinafter, when there is a difference in the signal responses between the two pixels, such a case will be referred to as occurrence of a sensitivity ratio between the two pixels. Such two pixels are used as target color pixels.

Note that major causes of occurrence of a sensitivity ratio between the Gr pixel and the Gb pixel include (1) a difference in spectral transmittance of a color filter or an IRCF (infrared cut filter), (2) a difference in a refractive index for each color of an MA (microlens array), and (3) mixture between pixels (crosstalk). Spatial distribution occurs in the sensitivity ratio because a degree of the above-described (1), (2) and (3) differs depending on a chief ray incidence angle (CRA) which differs according to an image height position.

Further, the sensitivity ratio spatial distribution depends on a shooting light source because sensitivities of the two pixels differ depending on the spectral spatial distribution of the object (a product of spectral radiance of the shooting light source and spectral reflectivity of the object). For example, when there is a large amount of red component in the spectral radiance of the shooting light source, a signal value of the Gr pixel which is adjacent to the R pixel is greater than a signal value of the Gb pixel which is adjacent to the B pixel.

Figure 5:
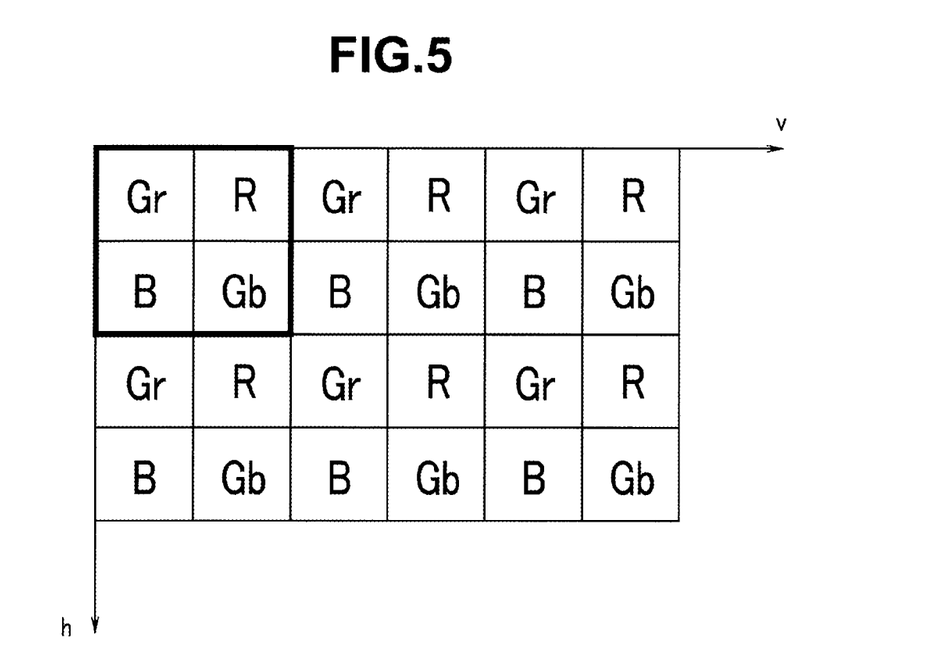
FIG. 5 is a diagram for explaining a calculation method of sensitivity ratio spatial distribution.
Figure 6:
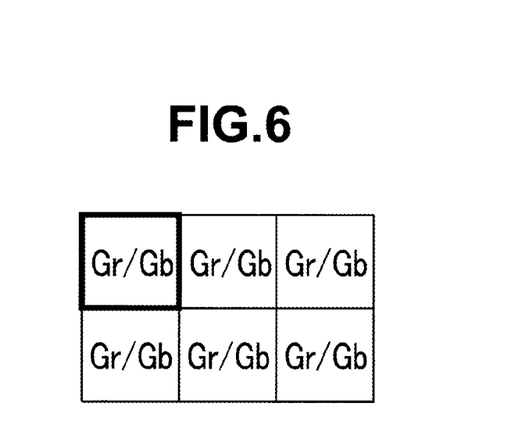
FIG. 6 is a diagram for explaining a calculation method of sensitivity ratio spatial distribution.

FIG. 5 and FIG. 6 are diagrams for explaining a calculation method of the sensitivity ratio spatial distribution. FIG. 5 illustrates one example of an image region for which light source estimation is to be performed, set by the target region extracting unit 11, and FIG. 6 illustrates sensitivity ratio spatial distribution calculated at the sensitivity ratio distribution calculating unit 12 using the image region illustrated in FIG. 5. As illustrated in FIG. 5, when the image region for which light source estimation is to be performed is a RAW image of 6 pixels×4 pixels, and the array of the color filter is such that Gr, R, B and Gb are arranged in this order from upper left, which is the order of raster scanning, a sensitivity ratio out(v, h) of each pixel position RAW(v, h) is calculated using the following equation (1):

$$\text{out}(v,h)=\text{RAW}(2v,2h)/\text{RAW}(2v+1,2h+1) \qquad \text{Equation (1)}$$

For example, a sensitivity ratio out(0, 0) in FIG. 6 is calculated by dividing a Gr pixel (RAW(0, 0)) in FIG. 5 by an adjacent Gb pixel (RAW(1, 1)). In a similar manner, a sensitivity ratio out(0, 1) in FIG. 6 is calculated by dividing a Gr pixel (RAW(0, 2)) in FIG. 5 by a Gb pixel (RAW(1, 3)).

Figure 7:
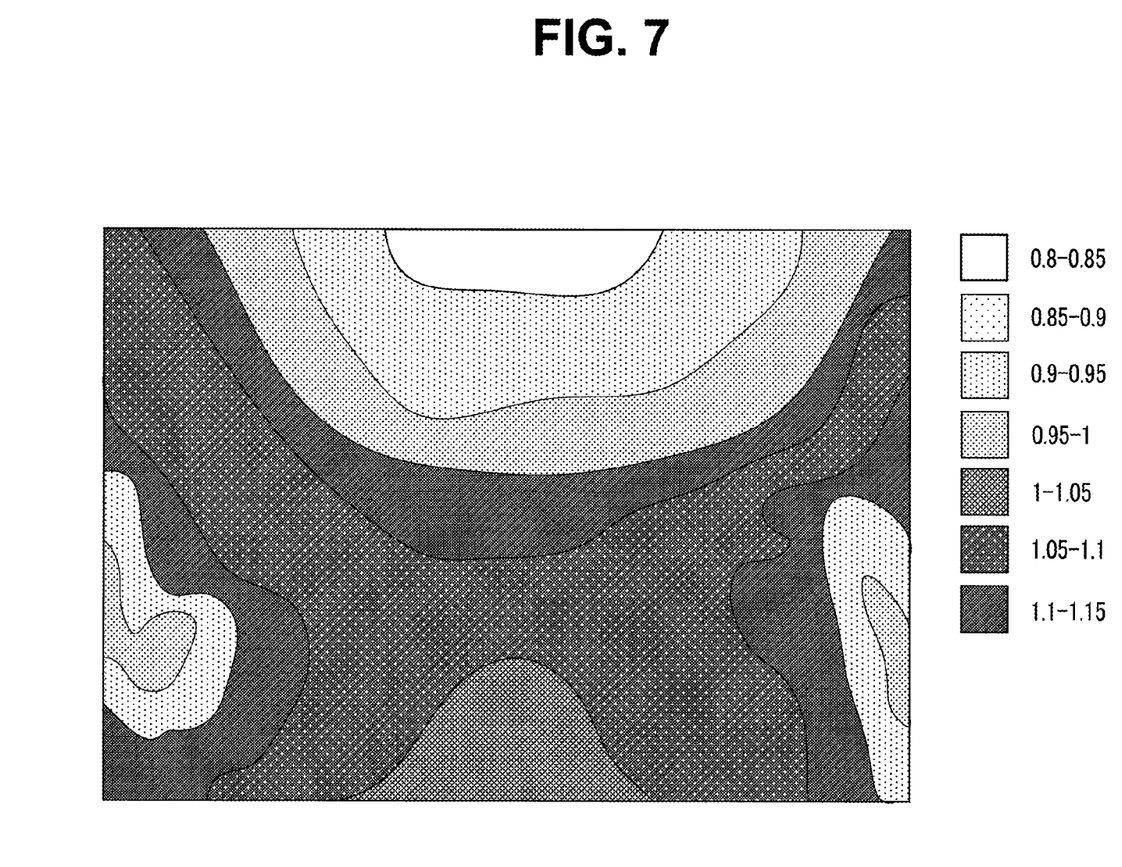
FIG. 7 is a diagram for explaining one example of image pickup sensitivity ratio spatial distribution.

In this manner, a sensitivity ratio of the same region is calculated using two target color pixels arranged in the pixel region of 2 pixels×2 pixels. Therefore, when the image region is 6 pixels×4 pixels, image pickup sensitivity ratio spatial distribution of 3 pixels×2 pixels is calculated. FIG. 7 is a diagram for explaining one example of the image pickup sensitivity ratio spatial distribution. FIG. 7 illustrates a sensitivity ratio out(v, h) of each pixel position RAW(v, h) calculated using the equation (1) as a two-dimensional contour map in which data is grouped according to ranges of sensitivity ration by 0.05.

The reference sensitivity ratio distribution data 13 is a database in which sensitivity ratio spatial distribution (hereinafter, referred to as reference sensitivity ratio spatial distribution) calculated at the sensitivity ratio distribution calculating unit 12 is stored for reference images which are obtained by shooting one or more known objects under one or more known light sources using the image sensor 2. As the known light sources (hereinafter, referred to as reference light sources), various kinds of light sources such as a standard light source such as an A light source and a D65 light source, a daytime white color light source, a light bulb color LED light source and a light source at an assumed shooting scene are used. Further, as the known objects (hereinafter, referred to as reference objects), monochrome images of various colors, an object which is assumed to be shot, or the like, are used.

Figure 8:
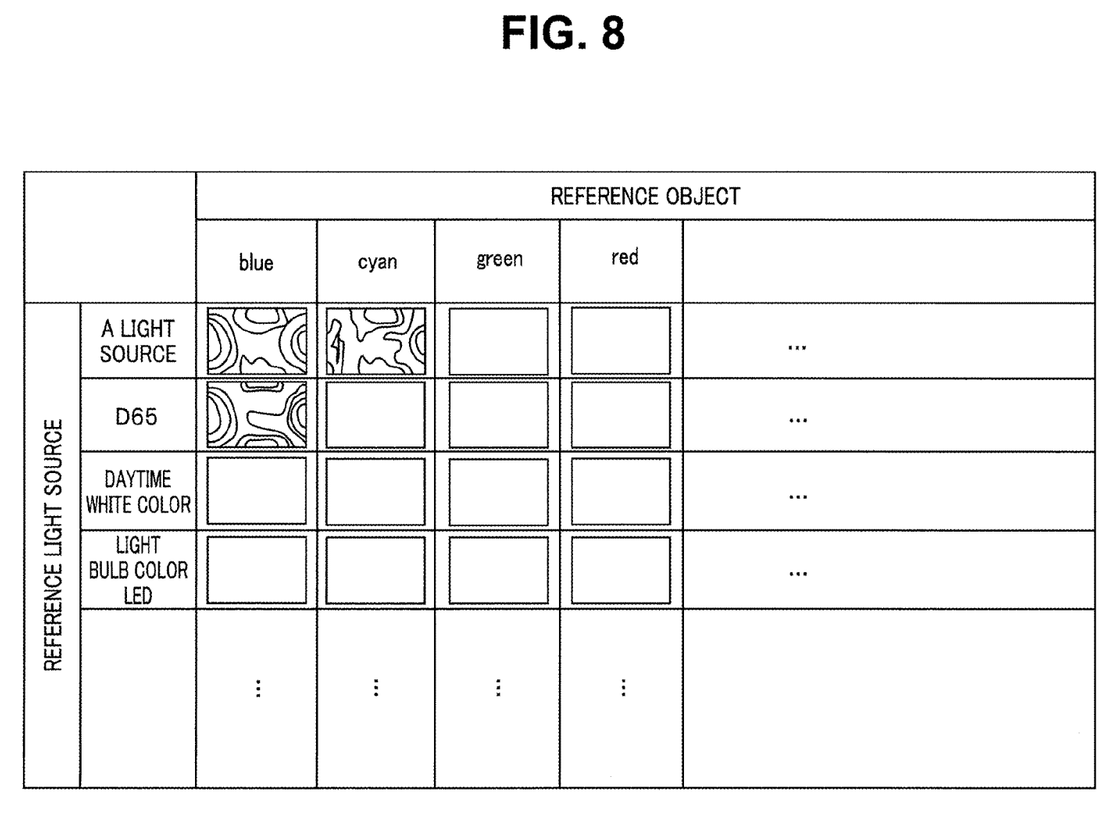
FIG. 8 is a diagram for explaining one example of reference sensitivity ratio spatial distribution data.

FIG. 8 is a diagram for explaining one example of the reference sensitivity ratio spatial distribution data. The reference sensitivity ratio spatial distribution data is expressed as a matrix table in which a reference light source is indicated as a column element and a reference object is indicated as a row element. In each cell of the matrix table, sensitivity ratio spatial distribution of a specific reference object shot under a specific reference light source is registered. For example, in FIG. 8, in a cell of a first row and a first column, sensitivity ratio spatial distribution of a blue monochrome image shot under the A light source is registered.

The color determining unit 14 determines similarity between the image region set at the target region extracting unit 11 and the reference object registered in the reference sensitivity ratio distribution data 13 based on color and selects a reference object with the highest similarity.

First, color space of the image region is converted into color space of the reference object. For example, when the color space of the reference object is YUV, and the color space of the image region is RGB, the color space of the image region is converted from RGB into YUV. When the color space of the image region is the same as the color space of the reference object, it is not necessary to convert the color space.

Subsequently, representative values of color of the image region are calculated. For example, when the color space is RGB, an average value of R, an average value of G and an average value of B are respectively calculated, and set as the representative values.

Finally, the representative values of color of the image region are compared with color values of the reference objects, and a reference object with the highest similarity is selected. For example, it is assumed that color images of blue ((R, G, B)=(0, 0, 255)), cyan ((R, G, B)=(0, 255, 255)), green ((R, G, B)=(0, 255, 0)), and red ((R, G, B)=(255, 0, 0)) are registered as the reference objects. When the representative values of the image region are (R, G, B)=(5, 245, 210), a color image of cyan is selected as a reference object with the highest similarity.

The similarity determining unit 15 compares similarity between the image pickup sensitivity ratio spatial distribution and the reference sensitivity ratio spatial distribution and outputs a reference light source of reference sensitivity ratio spatial distribution with the highest similarity as an estimated light source. Note that when the reference object with the highest similarity is selected at the color determining unit 14, similarity is compared within a range of the reference sensitivity ratio spatial distribution extracted using the selected reference object.

Similarity between the image pickup sensitivity ratio spatial distribution Cap(v, h) and the reference sensitivity ratio spatial distribution Ref(v, h) is compared using, for example, an index "sum of square difference (SSD)" expressed by the following equation (2). It is determined that similarity is higher for a smaller SSD.

$$SSD = \Sigma(Cap(v,h) - Ref(v,h))^2 \quad \text{Equation (2)}$$

Note that the similarity may be determined using an index other than the SSD, such as a sum of absolute difference (SAD).

Figure 9:
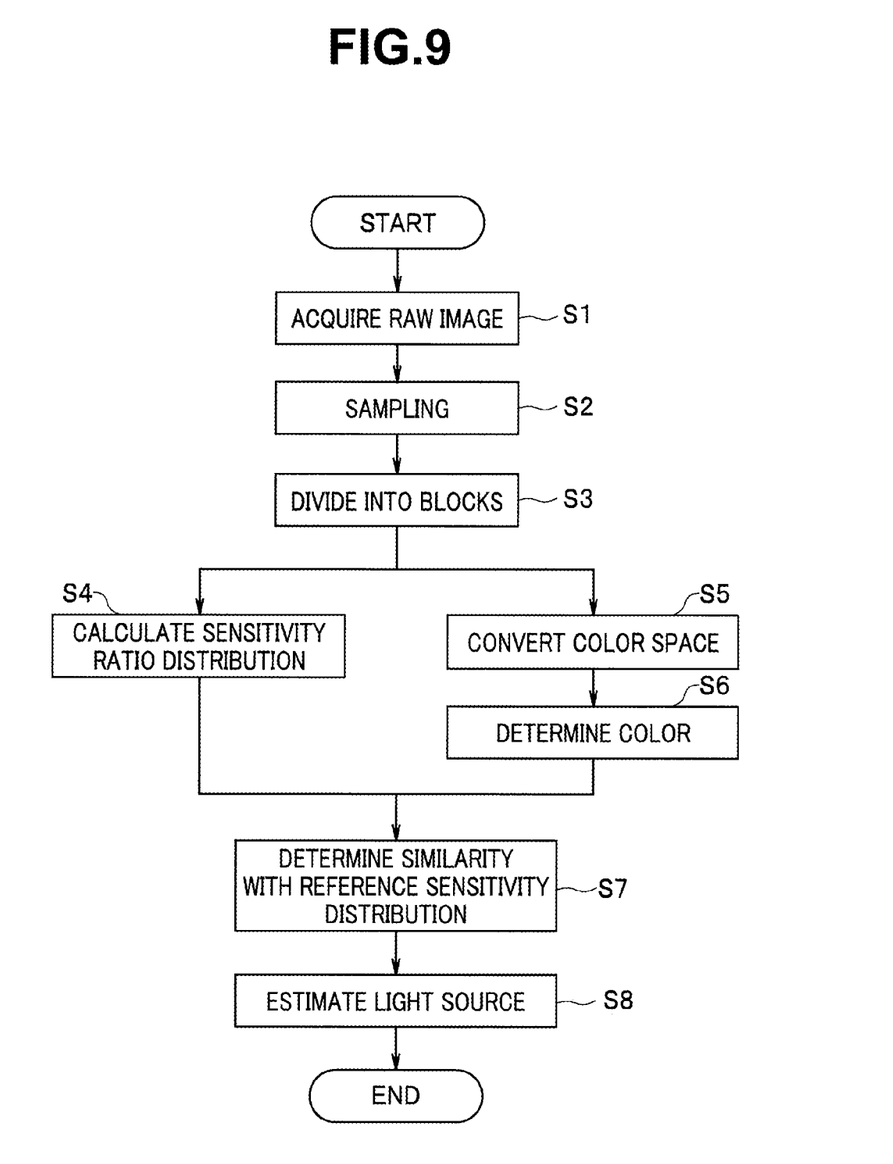
FIG. 9 is a flowchart for explaining one example of procedure of light source estimation according to the present embodiment.

Procedure of light source estimation at the light source estimating apparatus 1 in the present embodiment will be described next. FIG. 9 is a flowchart for explaining one example of the procedure of light source estimation according to the present embodiment.

First, a RAW image obtained by picking up an image of an object which becomes a target of light source estimation is acquired from the image sensor 2 (step S1). Note that the RAW image corresponding to one frame is acquired. Then, the target region extracting unit 11 performs sampling at an arbitrary size, for example, thins out a pixel at predetermined intervals from the acquired RAW image and reduces the size of the image which becomes a target of light source estimation (step S2). When it is not necessary to suppress a calculation amount or improve processing speed, step S2 may be omitted.

Subsequently, the target region extracting unit 11 divides the RAW image after sampling processing into one or more partial images of an arbitrary size to divide the image region which becomes a target of light source estimation into blocks (step S3). Note that if step S2 is omitted, the RAW image acquired from the image sensor 2 is divided into blocks. An image which becomes a target of light source estimation is selected from the partial images. Note that the light source estimation may be performed on only a specific partial image extracted from the partial images divided into blocks or may be respectively performed on all the generated partial images. When a plurality of image regions are selected, a series of the following procedure from step S4 to step S5 is executed on each of the selected image regions.

The sensitivity ratio distribution calculating unit 12 then calculates image pickup sensitivity ratio spatial distribution for the selected image region (step S4). In step S4, Gr and Gb pixels in the pixel block of two rows and two columns are used as the target color pixels.

Further, in parallel with step S4, the color determining unit 14 converts color space of the selected image region into color space of the reference object (step S5). Then, the color determining unit 14 calculates representative values of color of the image region. The calculated representative values are compared with color values of the reference objects, and a reference object with the highest similarity is selected (step S6).

Note that extraction of a reference object using color determination in steps S5 and S6 does not have to be necessarily performed, and can be omitted. However, when steps S5 and S6 are carried out, accuracy of light source estimation is improved. Further, when steps S5 and S6 are carried out, steps S5 and S6 may be sequentially performed after execution of step S4.

Subsequently, the similarity determining unit 15 compares similarity between the acquired image pickup sensitivity ratio spatial distribution and the reference sensitivity ratio spatial distribution and specifies a reference light source of reference sensitivity ratio spatial distribution with the highest similarity (step S7). Note that when steps S5 and S6 are executed and the reference object with the highest similarity is selected, reference sensitivity ratio spatial distribution calculated using the selected reference object is extracted, and the similarity is compared within a range of the extracted reference sensitivity ratio spatial distribution.

Finally, the similarity determining unit 15 estimates the specified reference light source as a light source upon shooting of the object which is a target of light source estimation and outputs the estimation result (step S8). Note that the estimation result may be outputted for each of the partial images which are divided into blocks in step S3, or one light source may be estimated for the whole RAW image (corresponding to one frame) prior to division from the estimation result of the light source in the partial image and outputted.

As described above, because the light source estimating apparatus 1 of the present embodiment calculates image pickup sensitivity ratio spatial distribution using two pixels (a Gr pixel and a Gb pixel) which have close center of gravity of spectral sensitivity and which have different sensitivity ratios depending on the object spectral distribution, it is possible to reduce influence of color of the object itself, so that it is possible to improve accuracy of light source estimation.

Note that while the above-described light source estimating apparatus 1 performs color determination through extraction of a reference object, other methods may be used. Further, the reference sensitivity ratio distribution data 13 is not required to be stored as a database in the light source estimating apparatus 1, and may be read from outside every time light source estimation is performed.

Second Embodiment

In a light source estimating apparatus of the second embodiment, a color filter pattern of an image sensor is a Bayer array of RGrBWG, and a G pixel and a WG pixel are used as target color pixels.

Figure 10:
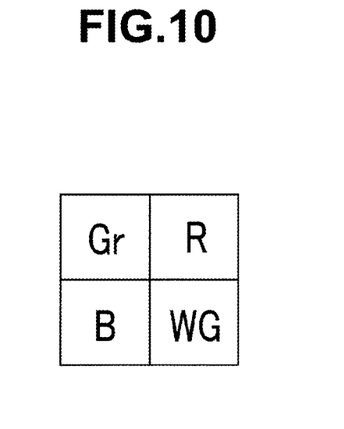
FIG. 10 is a diagram for explaining an array pattern of a color filter of an image sensor according to a second embodiment.

FIG. 10 is a diagram for explaining an array pattern of a color filter of the image sensor according to the second embodiment. In the color filter pattern, among pixel blocks of two rows and two columns, one of two G pixels is replaced with a wide green (WG) pixel. That is, a WG pixel is arranged in place of a Gb pixel.

Figure 11:
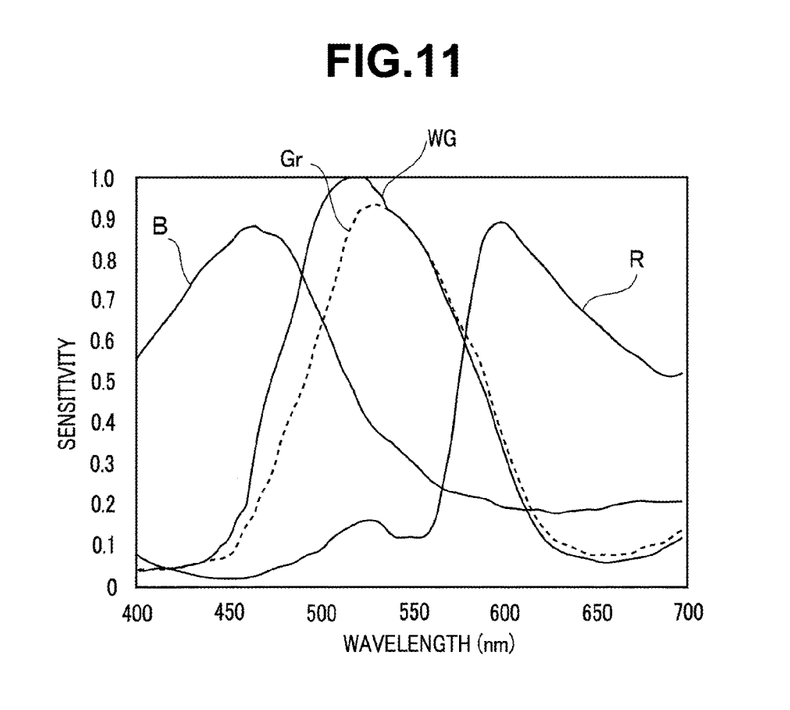
FIG. 11 is a diagram illustrating one example of spectral sensitivity characteristics of the color filter of FIG. 10.

FIG. 11 is a diagram illustrating one example of spectral sensitivity characteristics of the color filter of FIG. 10. A graph illustrated in FIG. 11 illustrates spectral sensitivity on a vertical axis and a wavelength on a horizontal axis. The spectral sensitivity on the vertical axis is expressed as a relative value which uses maximum sensitivity for each color light as 1. Sensitivity of the Gr pixel becomes maximum in the vicinity of a wavelength of 540 nm, and sensitivity of the WG pixel becomes maximum in the vicinity of a wavelength of 520 nm and in a wavelength relatively close to 540 nm. Further, a full width at half maximum of the spectral sensitivity characteristics of the WG pixel is greater than a full width at half maximum of the spectral sensitivity characteristics of the Gr pixel. While the Gr pixel and the WG pixel have the respective centers of gravity of the spectral sensitivity, the centers being close to each other, there occurs a sensitivity difference in signal responses according to arrangement positions.

A color filter array of the image sensor, components other than the target color pixels, and procedure for estimating a light source are the same as those described in the first embodiment.

Also in the present embodiment, when the color filter array of the image sensor is RGrBWG, image pickup sensitivity ratio spatial distribution is calculated using a Gr pixel and a WG pixel which have centers of gravity of spectral sensitivity, the centers being close to each other, and which have different sensitivity ratios depending on object spectral distribution. Therefore, as in the first embodiment, it is possible to reduce influence of color of the object itself, so that it is possible to improve accuracy of light source estimation.

Third Embodiment

A light source estimating apparatus of the third embodiment is different from the light source estimating apparatus in the first embodiment in that a color filter pattern of the image sensor is a Bayer array of RGBW, and a G pixel and one of W pixels (Wg, Wb, Wr) or two W pixels (a Wg pixel and a Wb pixel, a Wg pixel and a Wr pixel, and a Wb pixel and a Wr pixel) at different positions are used as the target color pixels. Note that a color filter array of the image sensor, components other than the target color pixels, and procedure of estimating a light source are the same as those described in the first embodiment.

Figure 12:
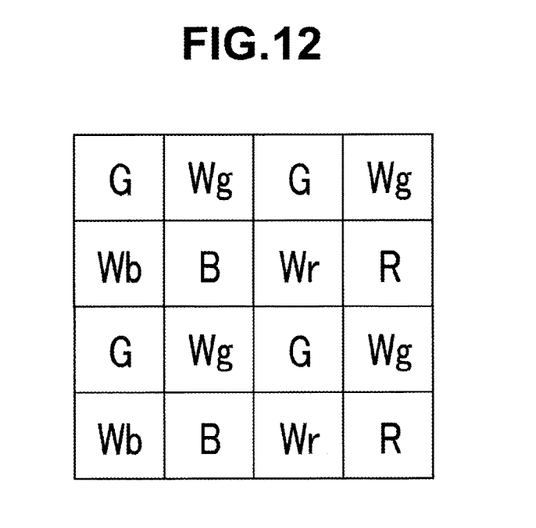
FIG. 12 is a diagram for explaining an array pattern of a color filter of an image sensor according to a third embodiment.

FIG. 12 is a diagram for explaining an array pattern of a color filter of the image sensor according to the third embodiment. In the color filter pattern, a pixel block of two rows and two columns is comprised of two white (W) pixels, one G pixel, and one of a B pixel and an R pixel. That is, one of a red color pixel (R) and a blue color pixel (B), and a green color pixel (G) are arranged in one of the diagonals, and white pixels (W) are arranged in the other diagonal.

Figure 13:
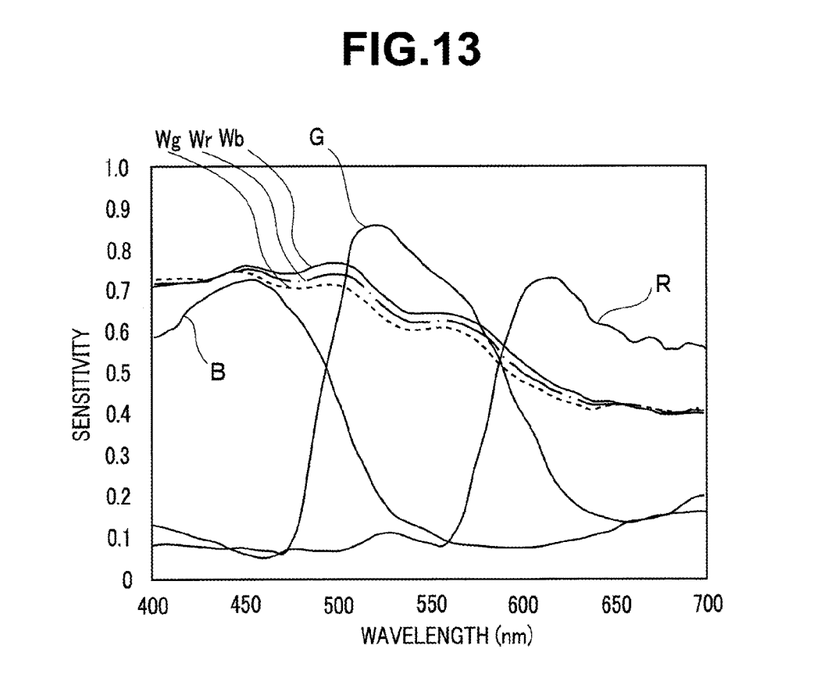
FIG. 13 is a diagram illustrating one example of spectral sensitivity characteristics of the color filter of FIG. 12.

FIG. 13 is a diagram illustrating one example of spectral sensitivity characteristics of the color filter of FIG. 12. A graph illustrated in FIG. 13 illustrates spectral sensitivity on a vertical axis and a wavelength on a horizontal axis. The spectral sensitivity on the vertical axis is expressed as a relative value which uses maximum sensitivity for each color light as 1. While each sensitivity of the Wg pixel, the Wb pixel and the Wr pixel all becomes maximum in the vicinity of a wavelength of 500 nm, and the Wg pixel, the Wb pixel and the Wr pixel have substantially identical shape of characteristics and centers of gravity of spectral sensitivity, the centers being close to one another, there occurs a sensitivity difference in signal responses according to arrangement positions. Further, while the G pixel, the Wg, Wb and Wr pixels have different maximum sensitivity and different shape of characteristics, the G pixel, the Wg, Wb and Wr pixels have centers of gravity of spectral sensitivity, the centers being close to one another, and there occurs a sensitivity difference in signal responses according to arrangement positions.

In this manner, also when the color filter array of the image sensor is RGBW, by calculating image pickup sensitivity ratio spatial distribution using a G pixel and one of W pixels (Wg, Wb, Wr) or two W pixels (a Wg pixel and a Wb pixel, a Wg pixel and a Wr pixel, and a Wb pixel and a Wr pixel) at different positions, it is possible to reduce influence of color of the object itself, so that it is possible to improve accuracy of light source estimation as in the first embodiment.

Note that combination of two target color pixels is not limited to the color pixels described in the first to the third embodiments, and any color pixel may be used if the color pixels have close center of gravity of spectral sensitivity and there occurs a sensitivity difference in signal responses according to arrangement positions.

Each "unit" in the present specification is conceptual and corresponds to each function in the embodiments, and does not necessarily correspond to specific hardware or software routine on a one-to-one basis. Therefore, in the present specification, the embodiments have been described assuming a virtual circuit block (unit) having each function in the embodiments.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. A method for estimating a type of light source, the method comprising:

calculating a first sensitivity ratio spatial distribution between a signal value of a first color pixel and a signal value of a second color pixel, the ratio being calculated from a first picked-up image picked up with an image sensor under an arbitrary light source, wherein the first color pixel and the second color pixel have color filters having a same spectral characteristic and the first color pixel and the second color pixel have different sensor responses;

calculating at least one second sensitivity ratio spatial distribution group from a second picked-up image picked up with the image sensor under a known light source;

estimating a type of the arbitrary light source based on a similarity between the first sensitivity ratio spatial distribution and the at least one second sensitivity ratio spatial distribution group; and storing the at least one second sensitivity ratio spatial distribution group in a storage unit, wherein the first color pixel is a Gr pixel, the second color pixel is a Gb pixel, and the at least one second sensitivity ratio spatial distribution group are calculated based on a ratio between a signal value of the Gr pixel and a signal value of the Gb pixel, wherein the at least one second sensitivity ratio spatial distribution group includes a plurality of second sensitivity ratio spatial distribution groups, and wherein each of the plurality of second sensitivity ratio spatial distribution groups is calculated from the second picked up image obtained by picking up images of an object under different light sources.

2. The method according to claim 1, further comprising:
calculating a representative value of color of the first picked-up image; and
selecting an object having a color value with highest similarity with the representative value,
wherein the step of estimating comprises calculating similarity between the at least one second sensitivity ratio spatial distribution group of the second picked-up image picked up with the image sensor and the first sensitivity ratio spatial distribution.

3. The method according to claim 1,
wherein the image sensor has a pixel array in which a plurality of color pixels are arranged in a lattice shape.

4. The method according to claim 1, further comprising:
extracting a pixel by dividing the first picked-up image into a plurality of partial regions,
wherein the step of calculating the first sensitivity ratio spatial distribution comprises calculating the first sensitivity ratio spatial distribution for each of the plurality of partial regions.

5. A method for estimating a type of light source, the method comprising:

calculating a first sensitivity ratio spatial distribution between a signal value of a first color pixel and a signal value of a second color pixel, the ratio being calculated from a first picked-up image picked up with an image sensor under an arbitrary light source, wherein the first color pixel and the second color pixel have color filters having a same spectral characteristic and the first color pixel and the second color pixel have different sensor responses;

calculating at least one second sensitivity ratio spatial distribution group from a second picked-up image picked up with the image sensor under a known light source;

estimating a type of the arbitrary light source based on a similarity between the first sensitivity ratio spatial distribution and the at least one second sensitivity ratio spatial distribution group, wherein the image sensor has a pixel array in which a plurality of color pixels are arranged in a lattice shape, the first color pixel is a Gr pixel, and the second color pixel is a WG pixel which has a full width at half maximum greater than a full width at half maximum of a function indicating spectral sensitivity characteristics of the Gr pixel.

6. The method according to claim 5,
further comprising extracting a pixel which is a calculation target of the first sensitivity ratio spatial distribution at predetermined intervals in the first picked-up image.

7. The method according to claim 6,
wherein the step of extracting a pixel comprises dividing the first picked-up image into a plurality of partial regions, and
wherein the step of calculating a first sensitivity ratio spatial distribution comprises calculating the first sensitivity ratio spatial distribution for each of the plurality of partial regions.

8. The method according to claim 5, further comprising:
calculating a representative value of color of the first picked-up image; and
selecting an object having a color value with highest similarity with the representative value,
wherein the step of estimating comprises calculating similarity between the at least one second sensitivity ratio spatial distribution group of the second picked-up image picked up with the image sensor and the first sensitivity ratio spatial distribution.

9. An image pickup apparatus comprising:
an image sensor having a first color pixel and a second color pixel, which have different sensor responses; and
a light source estimating apparatus configured to estimate a type of an arbitrary light source from a first picked-up image picked up with the image sensor under the arbitrary light source, wherein the light source estimating apparatus comprises:
a sensitivity ratio spatial distribution calculating unit configured to calculate a ratio between a signal value of the first color pixel and a signal value of the second color pixel in the first picked-up image to acquire a first sensitivity ratio spatial distribution; and
a similarity determining unit configured to estimate a type of the arbitrary light source based on similarity between a second sensitivity ratio spatial distribution group calculated using a second picked-up image picked up with the image sensor under a known light source and the first sensitivity ratio spatial distribution.

10. The image pickup apparatus according to claim 9,
wherein the light source estimating apparatus further comprises a storage unit configured to store a plurality of second sensitivity ratio spatial distribution groups, and
wherein each of the plurality of second sensitivity ratio spatial distribution groups is calculated from the second picked-up image obtained by picking up images of an object under different light sources.

11. The image pickup apparatus according to claim 9, wherein the light source estimating apparatus further comprises:
a color determining unit configured to calculate a representative value of color of the first picked-up image and select an object having a color value with highest similarity with the representative value, and
the similarity determining unit calculates similarity between the second sensitivity ratio spatial distribution group of the second picked-up image picked up using one object selected at the color determining unit and the first sensitivity ratio spatial distribution.

12. The image pickup apparatus according to claim 9, wherein the light source estimating apparatus is further configured to:
extract a pixel which is a calculation target of the first sensitivity ratio spatial distribution at predetermined intervals in the first picked-up image and divide the first picked-up image into a plurality of partial regions, and
calculate the first sensitivity ratio spatial distribution for each of the plurality of partial regions.

13. The image pickup apparatus according to claim 9,
wherein the image sensor has a pixel array in which a plurality of color pixels are arranged in a lattice shape, the first color pixel is a Gr pixel, and the second color pixel is a Gb pixel.

14. The image pickup apparatus according to claim 9,
wherein the image sensor has a pixel array in which a plurality of color pixels are arranged in a lattice shape, the first color pixel is a Gr pixel, and the second color pixel is a WG pixel having a full width at half maximum greater than a full width at half maximum of a function indicating spectral sensitivity characteristics of the Gr pixel.

* * * * *